United States Patent [19]

Tedesco et al.

[11] Patent Number: 5,471,327

[45] Date of Patent: Nov. 28, 1995

[54] HOLOGRAPHIC DIFFUSER FOR BACK-LIT DISPLAY

[75] Inventors: James M. Tedesco, Livonia; Lois A. K. Brady, Dexter; Willis S. Colburn, Ann Arbor, all of Mich.

[73] Assignee: Kaiser Optical Systems, Inc., Ann Arbor, Mich.

[21] Appl. No.: 62,381

[22] Filed: May 14, 1993

[51] Int. Cl.$^6$ ........................................................ G02B 5/32
[52] U.S. Cl. ................................ 359/15; 359/30; 359/49; 359/50; 359/599; 362/97; 362/223; 362/260
[58] Field of Search ................................ 359/15, 49, 50, 359/69, 599, 30; 362/23, 97, 223, 260, 317; 40/564, 577

[56] References Cited

U.S. PATENT DOCUMENTS

| | | | |
|---|---|---|---|
| 3,698,810 | 10/1972 | Bestenreiner et al. | 359/599 |
| 4,336,978 | 6/1982 | Suzuki | 359/599 |
| 4,372,639 | 2/1983 | Johnson | 350/3.7 |
| 4,425,604 | 1/1984 | Imai et al. | 362/223 |
| 4,427,265 | 1/1984 | Suzuki et al. | 359/599 |
| 4,586,781 | 5/1986 | Gunther et al. | 359/15 |
| 4,978,183 | 12/1990 | Vick | 359/15 |
| 4,984,872 | 1/1991 | Vick | 350/321 |
| 5,037,166 | 8/1991 | Malcolm et al. | 359/15 |
| 5,046,793 | 9/1991 | Hockley et al. | 359/12 |
| 5,278,532 | 1/1994 | Hegg et al. | 359/13 |
| 5,282,117 | 1/1994 | Fritts | 362/223 |
| 5,365,354 | 11/1994 | Jannson et al. | 359/15 |

FOREIGN PATENT DOCUMENTS

| | | | |
|---|---|---|---|
| 420072 | 4/1991 | European Pat. Off. | 359/50 |
| 2677136 | 12/1992 | France | G02B 5/02 |

OTHER PUBLICATIONS

M. Kowalczyk "Forming phase diffusers using speckle", SPIE vol. 673 Int. Conf. on Holographic Applications (1986) pp. 382–387.

B. M. Levine; J. C. Dainty "Non–Gaussian Image Plane Speckle: Measurements From Diffusers of Known Statistics", Optics Communications, 15 Apr. 1983, pp. 252–257.

P. F. Gray "A method of forming optical diffusers of simple known statistical properties", Optica Acta vol. 25, No. 8, pp. 765–775.

D. Meyerhofer "Holographic and Interferometric Viewing Screens" Applied Optics, vol. 12, No. 9, Sep. 1973, pp. 2180–2184.

R. C. Waag, K. T. Knox "Power–Spectrum Analysis of Exponential Diffusers" Jour. of the Optical Soc. of America, vol. 62, No. 7, Jul. 1972, pp. 877–881.

*Primary Examiner*—Loha Ben
*Assistant Examiner*—John Juba, Jr.
*Attorney, Agent, or Firm*—Gifford, Krass, Groh, Sprinkle, Patmore, Anderson & Citkowski

[57] ABSTRACT

A holographic diffuser for use in conjunction with a back-lit flat-panel display and a source of illumination in the form of one or more tubular lamp segments is recorded so as to receive light from the lamp segments and scatter it preferentially along a plane perpendicular to the axis of the bulbs. In a back-lit display having vertically oriented tubular lamps, the diffuser scatters substantially more in the horizontal dimension, thus filling in the gaps of light intensity between the bulbs, which would otherwise be viewed by an observer, as with conventional diffusers. The high aspect ratio diffusers of the present invention are preferably formed by projecting coherent radiation through a mask having dimensions functionally related to the desired final aspect ratio, with an optional collimating lens being used to project that mask to infinity. A contact exposure process is also described.

10 Claims, 3 Drawing Sheets

HOLOGRAPHIC DIFFUSER FOR BACK-LIT DISPLAY

FIELD OF THE INVENTION

The present invention relates generally to diffusers for back-lit displays, and, in particular, to holographic diffusers exhibiting high aspect ratio scattering patterns to provide uniform backlighting of a flat-panel display such as a liquid-crystal (LCD) display when lamps comprising one or more linear segments are used as the light source.

BACKGROUND OF THE INVENTION

Due to their small size and low weight, flat-panel displays have become increasingly popular for volume-limited and portable applications. See "Flat-Panel Displays," *Scientific American,* March 1993, p. 90. Transmissive displays such as liquid-crystal (LCD) displays have been especially well received due to their extremely low power consumption and potential for high resolution, including full color applications.

However, as they are non-emissive, such transmissive displays require some form of backlighting. Conventional backlights for high-brightness LCD displays, such as those used in high-performance aircraft cockpits, typically use a serpentine or "grid" fluorescent lamp or an array of linear lamp segments. A conventional diffuser is ordinarily used between the lamp and the LCD in an attempt to transform the highly structured lamp illumination into unstructured, uniform illumination behind the LCD. Diffusely reflecting surfaces, such as flat white paint are often used behind the lamp(s) to direct as much of the light output as possible back toward the diffuser and the LCD.

Conventional diffusers are ordinarily formed by a process which produces a roughened surface or embedded scattering sites on or within a substrate material. Conventional transmissive filters, for instance, include flashed opal, sandblasted glass and various flexible films exhibiting light-diffusing properties. In general, these approaches do not efficiently direct the light emitted by the backlight source toward the display panel. This is due to the fact that although light rays incident upon a conventional diffuser are scattered, the axis of the scattered light is usually substantially the same as the corresponding ray of incident light, which has a low probability of already being in the direction of the display panel.

Furthermore, even when the incident light and scattered light are in the general direction of the display panel, conventional diffusers are prone to backscatter and above which further limits their overall efficiency.

Generally speaking, efforts to improve the uniformity of conventional diffusers further degrade their efficiency. For example, by stacking conventional diffusers, or by using diffusers that scatter through a wide range of angles, uniformity will be improved, but backscatter and transmission loss will be experienced at each diffusing stage. Moreover, multiple panels increase manufacturing costs, or increase the depth of the backlight structure, or both.

It has been proposed to use holographic-type diffusers in conjunction with flat-panel displays such as LCDs, but for the purpose of facilitating readout when viewed at an angle oblique to the display surface, and not to improve the uniformity of backlighting. In these applications the diffusers are placed between the display and the observer as a projection screen, and not behind the display. In U.S. Pat. No. 5,037,166, for example, a holographic optical system is used to prevent unwanted reflections and glare as when the instrument panel is within an aircraft cockpit. In U.S. Pat. No. 5,046,793, a holographic diffuser is used to provide chromatic correction, or color balance, in addition to redirecting display information to one or more viewing locations oblique to the display surface.

Thus, there remains a need for a highly efficient diffuser, including a holographic-type diffuser, that could be employed for more efficient and uniform illumination of a flat-panel display such as a liquid-crystal (LCD) display. With a sufficiently high aspect ratio scattering pattern, the improved device would be capable of efficiently "filling in the gaps" of light between tubular-type sources of backlighting, thus providing a high-brightness display without light bands or patterns revealing the shape of the underlying sources.

SUMMARY OF THE INVENTION

The present invention is directed toward holographic diffusers, and methods for making such diffusers, which may advantageously be used in conjunction with back-lit flat-panel displays, such as liquid-crystal (LCD) displays. More particularly, diffusers produced in accordance with the present invention may be used when the source of backlighting illumination is in the form of one or more tubular-type lamps having lamp segments configured parallel to each other and to the plane of the display panel.

The diffuser comprises a holographic recording operative to receive light from each segment and diffract the light toward the back of the display panel but due to the technique used to record the hologram, the energy is scattered asymmetrically to redirect more light into the direction that fills in the "gaps" of light between the linear lamp segments. For example, if horizontally oriented bulbs are used as the source of backlighting, the diffuser scatters more vertically than horizontally. Thus, a viewer observing a back-lit display incorporating a diffuser sees a uniformly illuminated surface devoid of intensity modulation resulting from the structure of the source of illumination.

The aspect ratio of the scattering pattern exhibited by the holographic diffusers of the present invention may be adjusted in accordance with the physical configuration of the display assembly, including the distance between the lamp segments and the distance between the segments and the back surface of the display. Additionally, the diffusers may be recorded so as to be transmissive or reflective, and may be used in combination to further improve uniformity.

A method is shown to produce the holographic diffusers which obviates the requirement of a reference wavefront. The exposure consists entirely of light scattered from other diffusers having specific spatial characteristics with respect to the hologram being exposed, giving rise to the desired angular scattering profile. A coherent reference may alternatively be utilized, depending upon viewing considerations, such as the desired final viewing angle. Both projection-type and contact-type recording methods are disclosed as alternative embodiments.

DETAILED DESCRIPTION OF THE PREFERRED EMBODIMENT

Figure 1:
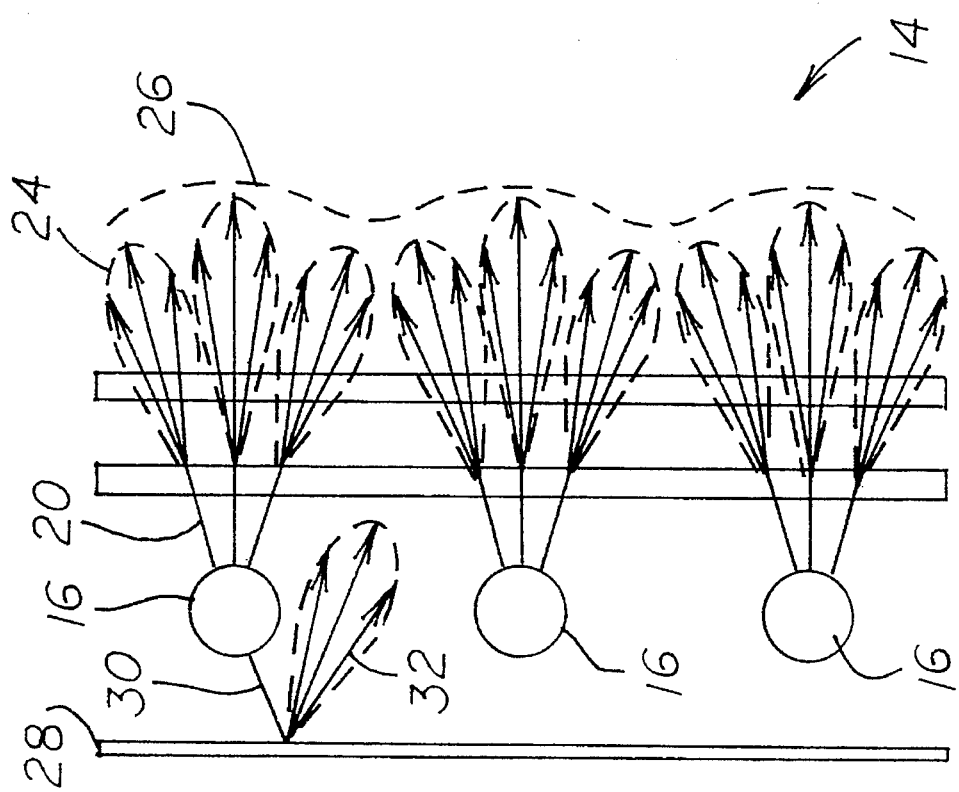
FIG. 1 is a cross-sectional drawing of a back-lit display panel incorporating a conventional prior-art light diffuser.

FIG. 1 is a drawing which depicts, in cross section, a back-lit transmissive-type of flat-panel display 12 which may be a liquid-crystal (LCD) type of display. Being non-emissive, display 12 requires some sort of backlighting to enable a viewer 14 to observe display symbology on the surface of the display. In this case, three tubular-type sources 16 are shown, these sources being either part of an array of parallel bulbs or segments of a single serpentine-type of lamp.

To obscure the structure of the illumination from the physical arrangement of the segments, a diffuser 18 has been placed between bulbs 16 and display 12. When a ray of light 20 strikes diffuser 18 at point 22 it is scattered into a lobe-shaped pattern 24. However, since diffuser 18 is of the conventional type, the axis through the scatter lobe is substantially co-axial to ray 20, and thus the intensity through the diffuser and display 12 falls off as a function of the distance from the bulb. As such, a modulated intensity pattern 26 is observed by viewer 14, as an annoying representation of the underlying lamp structure. To enhance overall light efficiency a reflective or diffusive surface 28 may be incorporated to reflect or scatter a light ray 30 into lobe 32. However, with conventional diffusers, even the use of reflective surfaces is not sufficient to overcome the undesirable intensity modulation.

Figure 2:
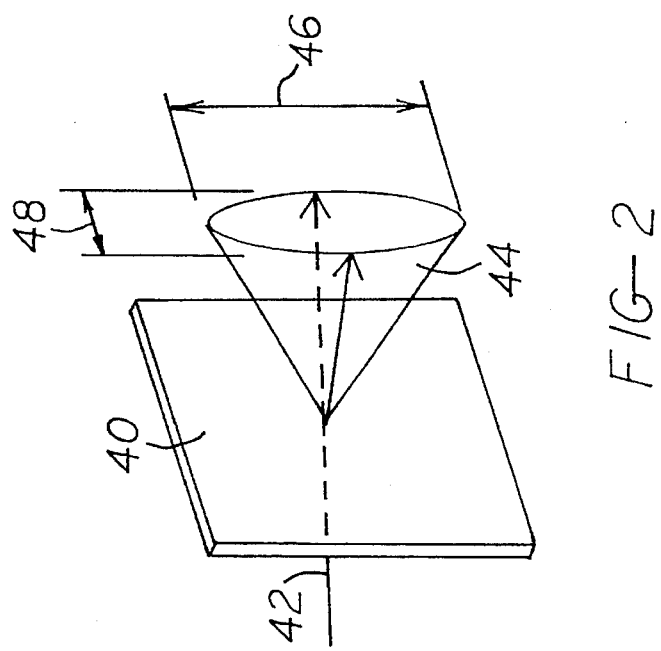
FIG. 2 is an oblique drawing of a holographic diffuser formed in accordance with the present invention exhibiting a scattering pattern with a tailored aspect ratio.

With holography, the angular extent of the scattering lobe can be made circular, as in the conventional diffuser just described, or highly asymmetric as shown in FIG. 2. With the appropriate recording method and apparatus, a holographic diffuser 40 can be tailored to scatter an incident light ray 42 into an asymmetrically-shaped lobe 44. Considering the oval-shaped cross section of this lobe to be within a rectangle, the rectangle will have a height 46 and a width 48 and an aspect ratio equal to the height versus the width. Holographic diffusers formed in accordance with this invention intentionally exhibit a high aspect ratio so that the overlapping of the scattered patterns fill in the gaps between back-light bulb segments, as would otherwise be viewed by an observer.

Figure 3:
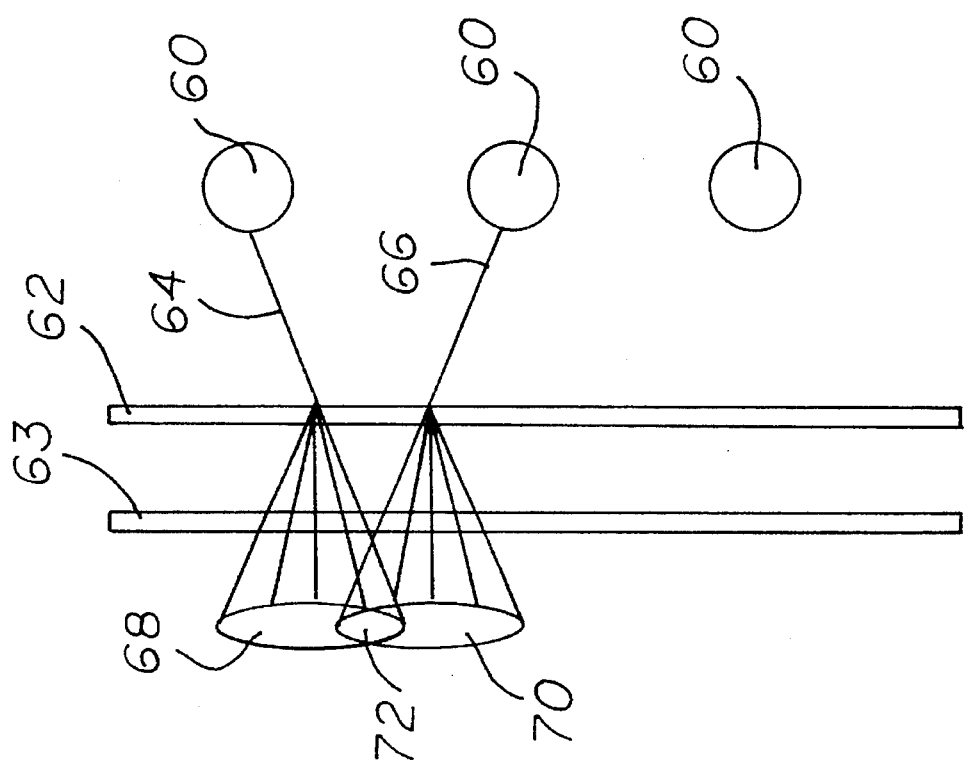
FIG. 3 is an oblique drawing of a holographic diffuser used with a plurality of tubular illumination sources to show how gaps between the sources are filled.

The effect of this high aspect ratio is illustrated in FIG. 3. Again, three tubular-type lamp segments 60 are shown as back lighting diffuser 62, in this case a holographic diffuser, which directs light to an LCD display 63. Two rays of light 64 and 66, are shown emanating from two of the three bulbs, and are scattered into high aspect ratio lobes 68 and 70, respectively. As the scattering in this case is more along the vertical dimension than along the axis of the bulbs, more overlap 72 is produced than would be produced utilizing a conventional diffuser. The additive effect of the overlapped region is intentionally designed to occur along the spaces between the bulbs, so as to provide uniform illumination across the entire surface of the display.

Figure 4:
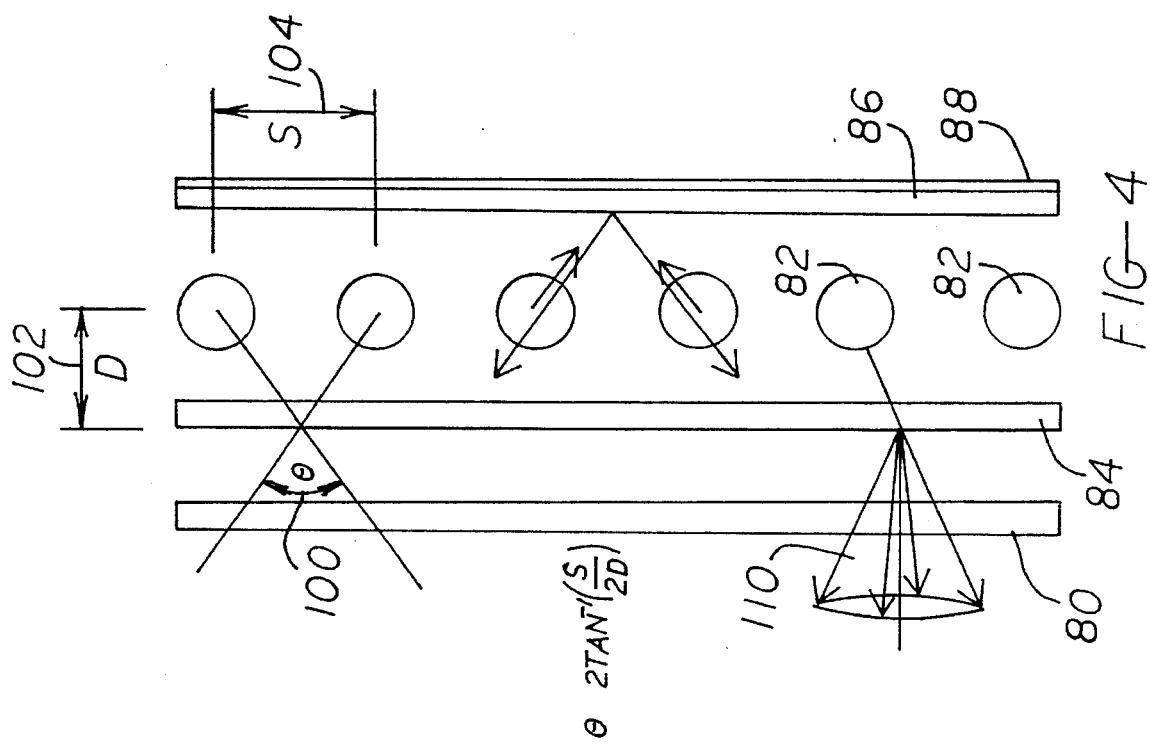
FIG. 4 is a cross-sectional drawing used to define geometries and to show how the holographic diffusers may be either transmissive or reflective.

These holographic diffusers may either be used transmissively, that is, between the sources of illumination and the back of the display surface, or reflectively, on the side of the illumination sources away from the display. Moreover, both a transmissive and a reflective holographic diffuser may be used in combination, an arrangement which is depicted in FIG. 4. In this figure, the display is shown at 80, the bulb sections are shown at 82, and a transmissive-type holographic diffuser is shown at 84. A reflective holographic diffuser, 86, is realized either through the use of a transmissive-type of diffuser disposed against a specular reflector 88, or, alternatively, a reflective-type of holographic diffuser may be recorded directly, thus eliminating the need for an accompanying reflective surface.

FIG. 4 is also being used to show specific geometries associated with the preferential scattering of the holographic diffusers. The larger angular dimension θ (100) of the high aspect ratio scattering profile is dictated by the distance D (102) of the lamp centerlines to the front surface of the diffuser, as well as lamp spacing S (104) wherein an ideal θ is dictated by the formula $$\theta = 2 \arctan \frac{S}{2D}.$$

The same, or a different angular value, may be recorded in the reflective diffuser, depending upon its spacing from the bulb centerlines. It should also be pointed out that efficiency and brightness are also enhanced by the fact that all scattered light, even that incident at off-normal angles, is directed into the forward viewing cone, as depicted by lobe 110, due to the unique nature of the holographic diffuser.

Figure 5:
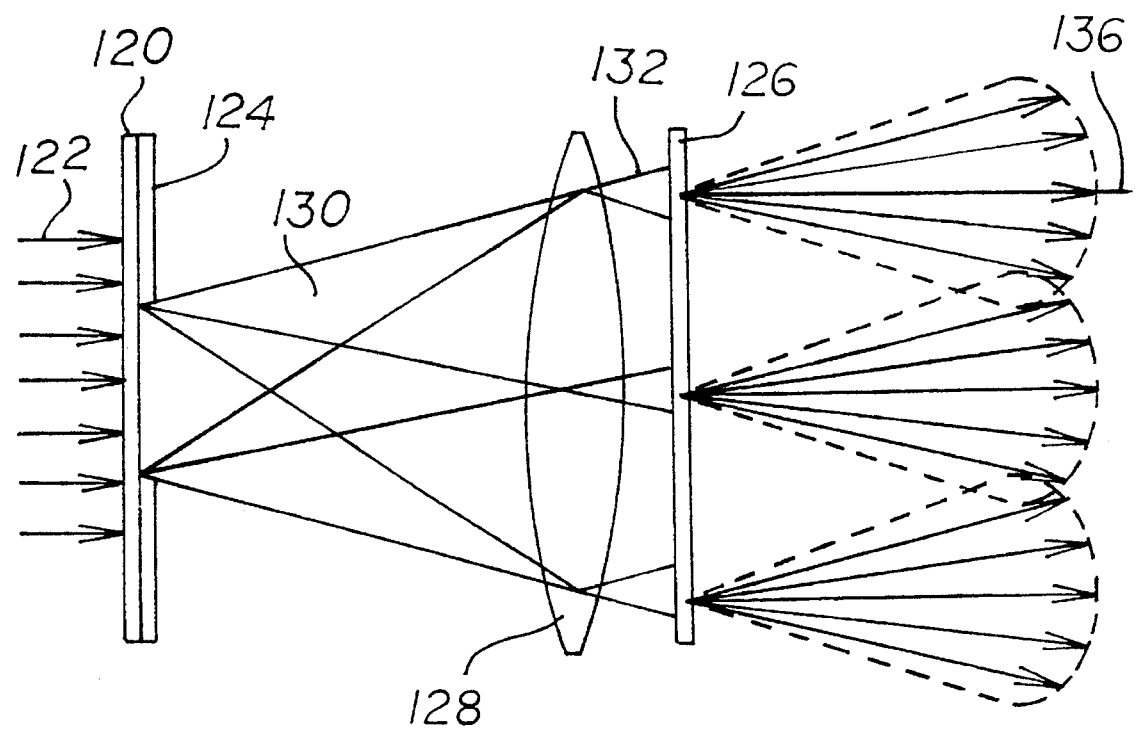
FIG. 5 is a schematic drawing of a projection recording technique to form a holographic diffuser.

FIG. 5 shows a schematic representation of a projection system used to form high aspect ratio holographic diffusers. In this configuration, a "real" or conventional diffuser 120, such as ground glass or flashed opal, is illuminated by a coherent laser beam 122 having been dispersed and collimated (if required) by optical elements (not shown), and masked with absorber 124 to produce the desired aspect ratio of diffuse illumination at the holographic plate 126. To first order, the aspect ratio of the mask controls the aspect ratio of the resulting holograms scatter pattern.

Essentially, the holographic diffuser records the speckle pattern generated by the masked diffuser, and if the mask is much larger in one dimension than in the other, the speckle pattern will have different feature size statistics in the two dimensions, which, in turn, will diffract light with different angular statistics in the two dimensions upon reconstruction. Unless the hologram is physically small relative to the rest of the recording setup shown in FIG. 5, the lobes may not be normal to the surface of the resulting diffuser but instead exhibit an angular diffraction pattern across the surface of the plate upon reconstruction. This effect, which is not illustrated in a figure, occurs because different portions of the holographic surface "see" the illumination as coming from different directions from the mask. This effect may be compensated, however, by projecting the mask diffuser to optical infinity through the use of a collimator lens 128 shown in FIG. 5. With this lens, scattered illumination 130 through mask 124 is collimated into rays 132 resulting in lobes 134, each being centered about an axis such as 136, which is substantially normal to the plane of diffuser 126.

Figure 6:
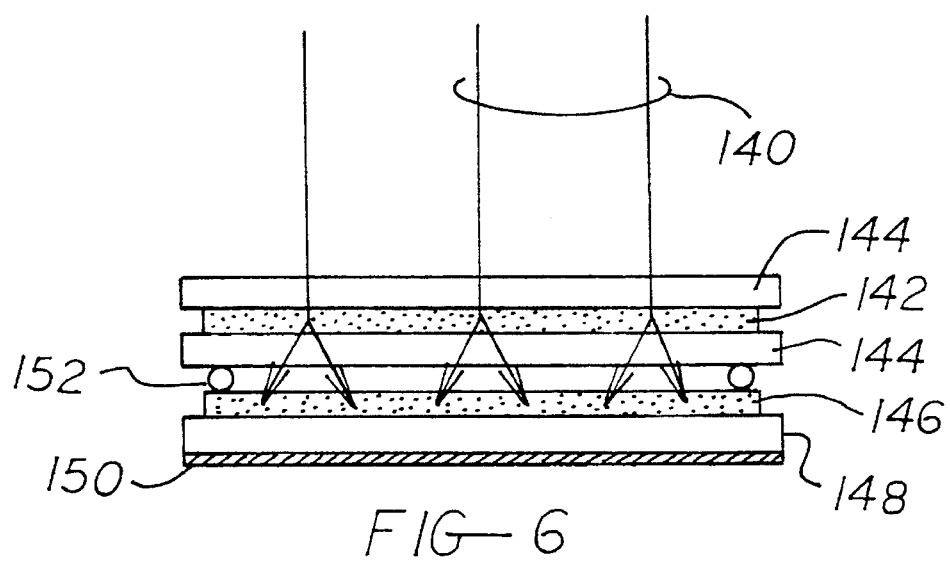
FIG. 6 is a side-view drawing of a contact copy diffuser exposure technique.

FIG. 6 illustrates an alternative method of forming high aspect ratio holographic diffusers, this being a simple "contact" or close proximity-type copy of a master asymmetric diffuser, which may be holographic, in lieu of projection through a mask. This process typically produces a holographic copy that scatters over larger angles than the master, therefore requiring an appropriately compensated master design. Collimated incident laser illumination 140 is directed through a master diffuser 142 which may be protected by sealing plates 144. The hologram to be recorded 146, may take the form of a coating of dichromated gel material on a substrate 148. An absorbent layer 150 is added beneath substrate 148, and some type of spacer, 152, may be used to space recording surface 146 away from plate 144, thus providing protection during exposure.

Having thus described our invention, we claim:

1. A backlight assembly for use with a transmissive-type flat-panel display having a back surface, the assembly comprising:

a source of backlighting including a plurality of parallel, spaced-apart, elongated lamp segments supported in a first plane;

a holographically recorded diffuser operatively disposed between the lamp segments and the display panel, in a second plane, the distance between the segments and the two planes defining a lamp geometry, the geometry associated with the recording of the diffuser being a function of the lamp geometry, resulting in a diffuser operative to receive light from the segments over a range of angles of incidence, and redirect the light toward the back surface of the display with an asymmetric scattering pattern characterized in that the angle of scattering is substantially greater within a plane perpendicular to the longitudinal direction of the lamp segments as compared to the direction parallel to the lamp segments, so as to fill in gaps of illumination Which would otherwise be visually evident in the display between said lamp segments.

2. The backlight assembly of claim 1 wherein the angle of scattering within the plane perpendicular to the lamp segments is at least $2\tan^{-1}(S/2D)$ where D is the distance between the diffuser and the lamp centerlines and S is the distance between the lamp centerlines.

3. The backlight assembly of claim 1 wherein the display panel has a horizontal dimension and a vertical dimension, the lamp segments being oriented horizontally with respect to the display panel, and wherein the diffuser exhibits a vertical scattering angle that is substantially greater than its horizontal scattering angle.

4. The backlight assembly of claim 1 wherein the display panel has a horizontal dimension and a vertical dimension, the lamp segments being oriented vertically with respect to the display panel, and wherein the diffuser exhibits a horizontal scattering angle that is substantially greater than its vertical scattering angle.

5. The backlight assembly of claim 1, wherein the second plane is disposed between the first plane and the back surface of the display, the holographically recorded diffuser being transmissive.

6. The backlight assembly of claim 1, wherein the first plane is disposed between the second plane and the back surface of the display panel, the holographically recorded diffuser being reflective.

7. The method of recording a holographic diffuser for use with a back-lit, flat-panel display illuminated by a plurality of parallel, spaced-apart lamp segments supported in a first plane parallel to, and spaced apart from, the plane of the flat-panel display, the method comprising the steps of:

choosing a second plane, parallel to the first, in which to ultimately position the diffuser, and recording a hologram to be used as the diffuser by passing coherent light through a different diffuser and an apertured mask, the dimensions of the aperture being a function of the distance between the lamp segments and the distance between the first and second planes.

8. The method of claim 7, including the step of choosing the second plane between the display panel and the plane of the lamp segments.

9. The method of claim 7, including the step of choosing the second plane such that the plane of the lamp segments is between the display panel and the second plane.

10. The method of claim 7, wherein the step of recording the hologram is based upon the relationship:

$$\theta = 2\tan^{-1}(S/2D),$$

where:

D is the distance between the diffuser and the lamp centerlines;

S is the distance between the lamp centerlines, and $\theta$ is the angle of scattering in a plane perpendicular to the lamp segments.

* * * * *